H. C. EVELYN.
BUMPER SUPPORTING BRACKET.
APPLICATION FILED NOV. 30, 1921.
1,424,395.
Patented Aug. 1, 1922.
2 SHEETS—SHEET 1.
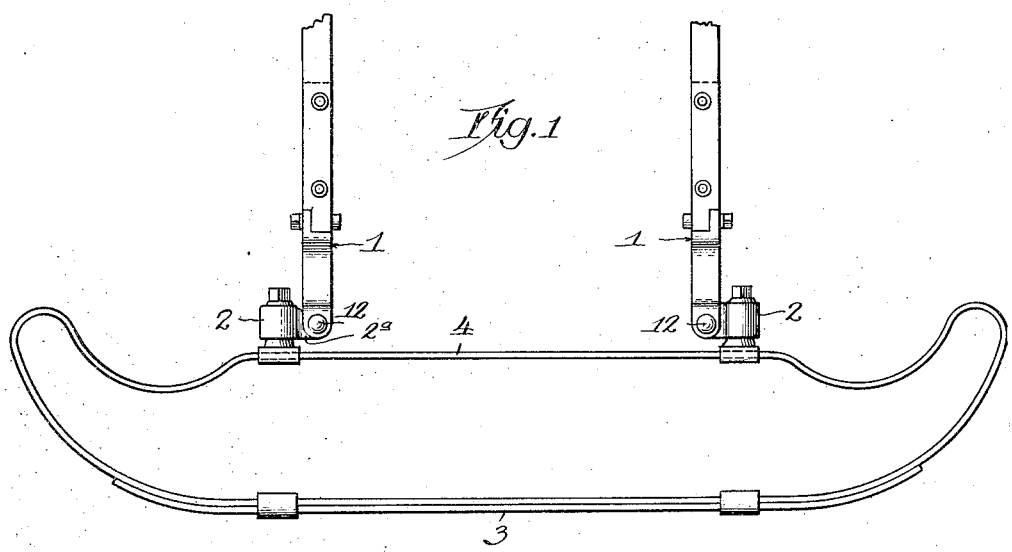
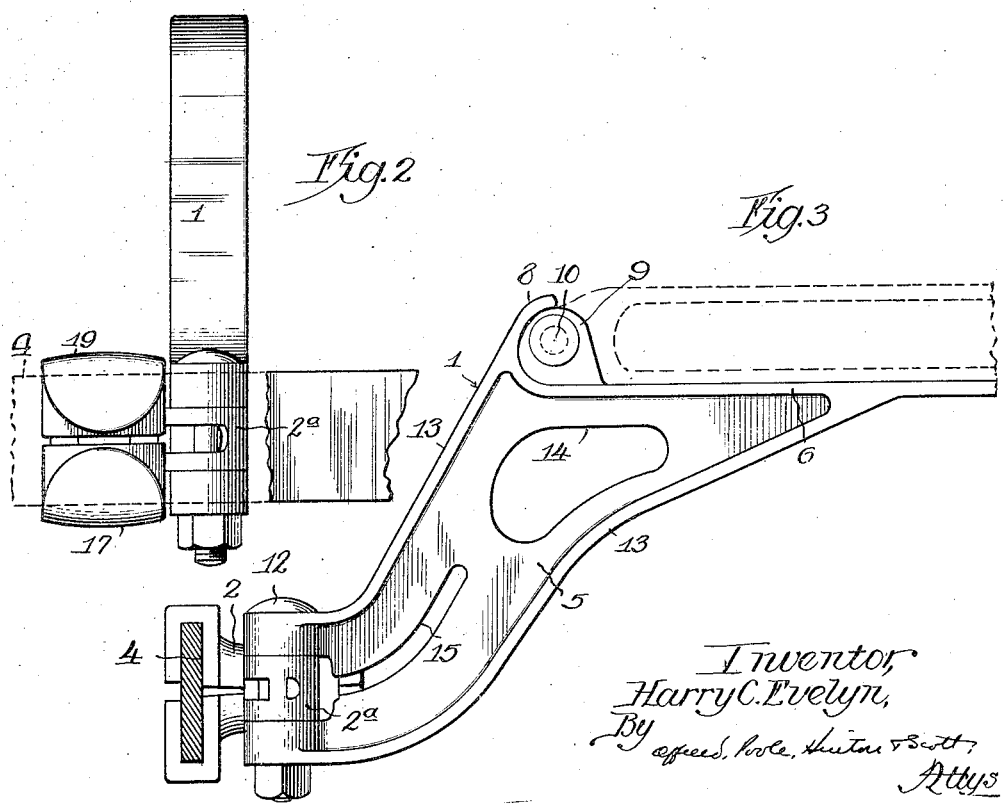
Inventor,
Harry C. Evelyn,
By
Attys

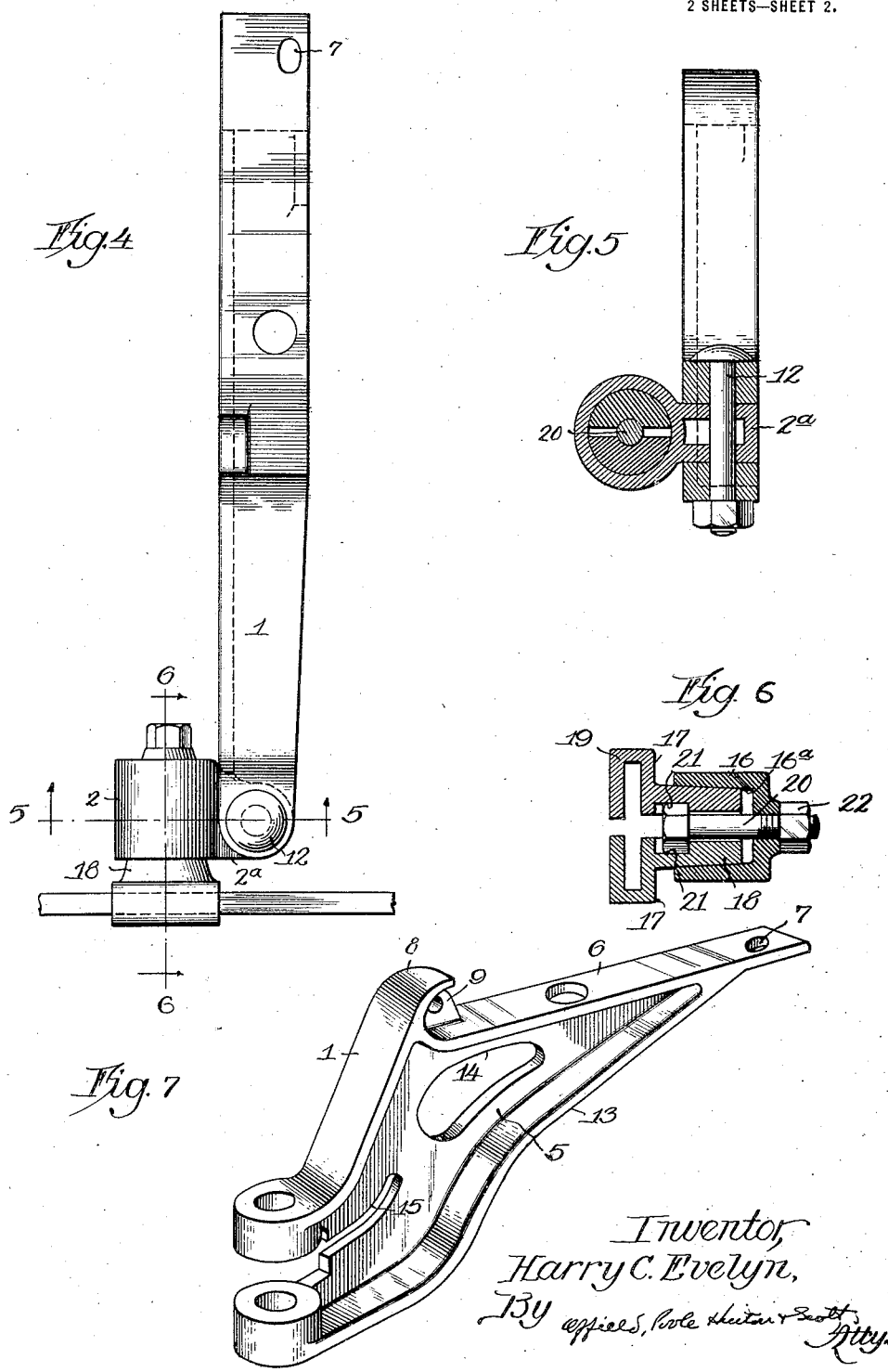

UNITED STATES PATENT OFFICE.

HARRY C. EVELYN, OF CHICAGO, ILLINOIS, ASSIGNOR, BY MESNE ASSIGNMENTS, TO BIFLEX PRODUCTS COMPANY, A CORPORATION OF DELAWARE.

BUMPER-SUPPORTING BRACKET.

1,424,395.   Specification of Letters Patent.   Patented Aug. 1, 1922.

Application filed November 30, 1921. Serial No. 518,777.

*To all whom it may concern:*

Be it known that I, HARRY C. EVELYN, a citizen of the United States, and a resident of Chicago, in the county of Cook and State of Illinois, have invented certain new and useful Improvements in Bumper-Supporting Brackets, of which the following is a specification.

This invention relates to improvements in bumper supporting brackets, and more particularly to a mounting or fitting especially designed for attaching a bumper to the frame members of an automobile.

The object of the invention is to provide a strong and substantial construction for a supporting bracket capable, by reason of its design, to be readily secured to the frame members of an automobile, and affording a practical and flexible connection between the bumper proper and the automobile frame, the parts of the supporting bracket being capable of yielding with the distortion of the bumper under force of impacts delivered against it.

As a preferred embodiment of the invention, I have disclosed a bracket especially designed for supporting a bumper at the rear end of an automobile, although it is to be understood that with suitable alterations in design, the same may be employed for mounting a bumper at the forward end of an automobile.

The drawings in which such a structure is fully disclosed may be briefly described as follows:

Fig. 1 is a top plan view of the brackets in their relative positions as attached to an automobile, and showing a bumper supported thereby, Fig. 2 is an enlarged detailed view in front elevation of a single bracket connected with a bumper.

Fig. 3 is a view in side elevation of the bracket in bumper supporting position, Fig. 4 is an enlarged top plan view of a single bracket in bumper supporting position, Fig. 5 is an enlarged view in vertical section taken on line 5, 5 of Fig. 4, Fig. 6 is an enlarged detailed view in longitudinal section, taken on line 6, 6 of Fig. 4, and Fig. 7 is a perspective view of the bracket with the intermediate bumper supporting member removed.

In general, the bumper supporting brackets comprise two plates 1, 1 adapted to be fixed to the longitudinal frame members of an automobile A, A, and preferably at the rear ends thereof, said plates being bolted to the under side of said frame members either by bolts which pass through the lowermost horizontal flange of the frame member, and a complementary flange of the bracket, or by utilizing in addition to said bolts, provided for the purpose, a shackle bolt located at the extremity of the frame member and acting to connect the rear spring shackle with said frame member. At the forward end of each plate is a clamping member 2 having pivotal connection therewith and direct clamping engagement with a bumper 3, through the medium of a rearwardly disposed bar 4 thereof, extending transversely between the brackets.

Referring now more in detail to a single bracket, the same comprises a plate 5 to which a clamping member 2 is pivotally connected. The plate is preferably of cast metal of somewhat irregular shape having a longitudinally extending flange 6 along its topmost edge, and adapted to have flatwise bearing engagement with the under side of the frame member A, and provided with a suitable number of bolt holes, such as 7 through which bolts may pass. At one end of the plate 5, the flange 6 terminates in an upturned semi-circular extremity 8 partially surrounding a vertical lug 9 having a hole 10 therein, said extremity 8 and lug 9 forming a pocket to receive the extremity of the frame member A, the lug 9 bearing against the side of said frame member at the point where a bolt would ordinarily be located, said bolt serving to engage the hole 9 in said lug. From the uppermost edge of the plate 5, the same extends obliquely in a downward and outward direction, gradually tapering and curving to form a vertically disposed cylindric end portion 11 serving as a journal for a pivot bolt 12, whereby the clamping member 2 is connected. The cylindric bearing 11 is preferably divided into two portions with a space intermediate its ends, thereby forming two separated ears between which is inserted a cylindric bearing portion 2ª of the clamping member 2. In order to strengthen the plate 5, reinforcing webs 13, 13 extend along the edges thereof from the flange 6 to the cylindric bearing portion 11, and furthermore, in order to decrease the weight of the plate and to introduce a degree of resiliency adjacent the bearing portion 11, a portion of the metal is removed, as at 14, and a slot 15 formed in the lower end portion of the plate extending forwardly and upwardly from the space between the ears of said bearing member 11.

The clamping member 2 comprises parts as follows: A cylindric shell 16, having its axis located in a horizontal plane, is provided with a radially projecting lug or ear, heretofore referred to as a member 2ª extending between the ears of the bearing portion 11, and having pivotal engagement with the pivot bolt 12. This ear or lug is cylindric in shape, and permits the cylindric shell of the clamping member to rotate about the vertical axis of the bolt 12 substantially throughout the arc somewhat greater than a semi-circle. The cylindric shell 16 is open at one end, and forms a socket 16ª tapering slightly toward its inner end. Within this socket are inserted two clips 17, 17, each consisting of a shank 18 semi-cylindrical in shape, tapered to correspond with that of the socket, and a U-shaped outer end portion 19, each adapted to face in opposite directions and toward each other, thereby forming a horizontal channel through which the bar 4 of the bumper may extend. Extending axially through the closed end of the shell 16 is a bolt 20 so arranged that its head is located within the socket of the shell 16, and lodged within notches 21, 21 formed in the opposed faces of the shanks 18, 18, thereby anchoring the clips within the cylindric shell 16 and providing an arrangement whereby the clips may be drawn into the socket or forced outwardly therefrom, and by the endwise movement of the bolt through the medium of a nut 22 applied to the threaded end of the bolt projecting from the closed end of said shell. By reason of the contact between the tapered surfaces of the socket 16ª and the shank portions 18, 18 of the clips, the latter are drawn together by shifting the bolt 20 axially by turning the nut, thereby firmly gripping the bar 4 after the parts have been assembled.

In referring to the function of the supporting brackets, it is preferred to consider the bumper 3 as made up of resilient metal bars, thus imparting to the bumper structure a certain degree of resiliency so that the same necessarily undergoes more or less distortion when an impact is delivered against it. For example, if the blow is received at the central portion of the bumper, the result would be a transverse yielding of the bars, which is transmitted in a somewhat modified degree to the rear bar 4. Manifestly, the clamping members 2 are free to revolve about the axis of the pivot bolt 12, so that with each and every distortion of the bumper, said clamping members will be displaced to compensate for the distortion of the rear bar 4 directly connected thereto. In this manner the torsional strain which otherwise would be transmitted to the fixed parts of the bracket is eliminated, and a more flexible support is thereby provided without sacrificing strength and rigidity of the supporting structure. A further feature of the bracket construction herein disclosed resides in its adjustability to meet the various departures in design that exist in different makes of vehicles, and particularly with respect to the width of the frame between the longitudinal frame members. For instance, the width of the frame members might be such that in applying the brackets thereto the same might readily be spaced apart a much greater distance than is shown in Fig. 1, in which case it would be impossible to attach the bumper with the clamping members 2, 2 located beyond the plates 5, 5, as shown. Such a condition, however, is easily met by shifting the clamping members so that they accupy a corresponding position on the inner side of the plates 5, 5, this being done either by interchanging the two clamping members 2, 2, or by removing each clamping member, turning it upside down, and replacing it in the position desired. In either position, the clamping members are equally yieldable to the distortions of the bumper, and otherwise function in the same manner as heretofore described.

Having fully disclosed the invention, I claim—

1. In a bumper supporting bracket, the combination of an arm adapted for attachment to the frame member of an automobile, a bumper engaging member pivotally mounted at the free end of said arm in offset relation to the pivotal axis.

2. In a bumper supporting bracket, the combination of an arm adapted for attachment to the frame member of an automobile, a bumper engaging member pivotally mounted at the free end of said arm, and comprising a body member offset from the pivotal axis, and clips carried by said body member.

3. In a bumper supporting bracket, the combination of an arm adapted to be fixed to the frame member of an automobile, a bumper engaging member pivotally connected to the free end of said arm, and comprising a cylindric body member offset from its pivotal axis, and clips mounted in said body member and adapted to engage the bar of a bumper.

4. In a bumper supporting bracket, the combination of an arm adapted to be fixed to the frame member of an automobile, a bumper engaging member pivotally mounted to swing about a vertical axis at the free end of said arm, and comprising a cylindric body member offset from its pivotal axis, and clips mounted in said body member and adapted to detachably engage the bar of a bumper.

5. In a bumper supporting bracket, the combination of an arm adapted to be secured to the end of an automobile frame member, a cylindric body member provided with a radially extending ear having pivotal connection with the free end of said arm through the medium of a vertical pivot bolt, bar-engaging clips mounted in a socket formed in said body member, and means acting to tighten said clips into clamping engagement with said bar.

6. In a bumper supporting bracket, the combination of an arm adapted to be secured to one end of an automobile frame member, a cylindric body member pivotally connected with the free end of said arm through the medium of a radially projecting ear and a vertically disposed pivot bolt, clips fitting in a tapered socket formed in said body member, and a screw mounted in said body member and operative to draw said clips into clamping engagement with a bar of a bumper.

In witness whereof, I hereunto subscribe my name this 26th day of November, A. D., 1921.

HARRY C. EVELYN.